INVENTOR
D. SLEPIAN
BY
Alan C. Rose
ATTORNEY

INVENTOR
D. SLEPIAN
BY Alan C. Rose
ATTORNEY

FIG. 4

| TOTAL DIGITS | $i$ | $\binom{n}{i}$ | INFORMATION DIGITS → k=2 $a_i$ | k=3 $a_i$ | k=4 $a_i$ | k=5 $a_i$ | k=6 $a_i$ | k=7 $a_i$ | k=8 $a_i$ | k=9 $a_i$ | k=10 $a_i$ |
|---|---|---|---|---|---|---|---|---|---|---|---|
| $n=4$ | 0 | 1 | 1 | | | | | | | | |
| | 1 | 4 | 3 | | | | | | | | |
| $n=5$ | 0 | 1 | 1 | 1 | | | | | | | |
| | 1 | 5 | 5 | 3 | | | | | | | |
| | 2 | 10 | 2 | | | | | | | | |
| $n=6$ | 0 | 1 | 1 | 1 | 1 | | | | | | |
| | 1 | 6 | 6 | 6 | 3 | | | | | | |
| | 2 | 15 | 9 | 1 | | | | | | | |
| $n=7$ | 0 | 1 | 1 | 1 | 1 | 1 | | | | | |
| | 1 | 7 | 7 | 7 | 7 | 3 | | | | | |
| | 2 | 21 | 18 | 8 | | | | | | | |
| | 3 | 25 | 6 | | | | | | | | |
| $n=8$ | 0 | 1 | 1 | 1 | 1 | 1 | 1 | | | | |
| | 1 | 8 | 8 | 8 | 8 | 7 | 3 | | | | |
| | 2 | 28 | 28 | 20 | 7 | | | | | | |
| | 3 | 56 | 27 | 3 | | | | | | | |
| $n=9$ | 0 | 1 | 1 | 1 | 1 | 1 | 1 | 1 | | | |
| | 1 | 9 | 9 | 9 | 9 | 9 | 7 | 3 | | | |
| | 2 | 36 | 36 | 33 | 22 | 6 | | | | | |
| | 3 | 84 | 64 | 21 | | | | | | | |
| | 4 | 126 | 18 | | | | | | | | |
| $n=10$ | 0 | 1 | 1 | 1 | 1 | 1 | 1 | 1 | 1 | | |
| | 1 | 10 | 10 | 10 | 10 | 10 | 10 | 7 | 3 | | |
| | 2 | 45 | 45 | 45 | 39 | 21 | 5 | | | | |
| | 3 | 120 | 110 | 64 | 14 | | | | | | |
| | 4 | 210 | 90 | 8 | | | | | | | |
| $n=11$ | 0 | 1 | 1 | 1 | 1 | | 1 | 1 | 1 | 1 | |
| | 1 | 11 | 11 | 11 | 11 | | 11 | 11 | 7 | 3 | |
| | 2 | 55 | 55 | 55 | 55 | | 20 | 4 | | | |
| | 3 | 165 | 165 | 126 | 61 | | | | | | |
| | 4 | 330 | 226 | 63 | | | | | | | |
| | 5 | 462 | 54 | | | | | | | | |
| $n=12$ | 0 | 1 | 1 | 1 | | | | 1 | 1 | 1 | 1 |
| | 1 | 12 | 12 | 12 | | | | 12 | 12 | 7 | 3 |
| | 2 | 66 | 66 | 66 | | | | 19 | 3 | | |
| | 3 | 220 | 220 | 200 | | | | | | | |
| | 4 | 495 | 425 | 233 | | | | | | | |
| | 5 | 792 | 300 | | | | | | | | |

CORRECTION CAPABILITIES OF VARIOUS "ALPHABETS"

INVENTOR
D. SLEPIAN
BY Alan C. Rose
ATTORNEY

Feb. 23, 1960 D. SLEPIAN 2,926,215

ERROR CORRECTING SYSTEM

Filed Aug. 24, 1955 4 Sheets-Sheet 4

FIG. 5

| TOTAL DIGITS | INFORMATION DIGITS → | | | | | | | | |
|---|---|---|---|---|---|---|---|---|---|
| | k=2 | k=3 | k=4 | k=5 | k=6 | k=7 | k=8 | k=9 | k=10 |
| n=4 | 32<br>412 | | | | | | | | |
| n=5 | 312<br>42<br>51 | 412<br>513 | | | | | | | |
| n=6 | 32<br>412<br>51<br>61 | 412<br>513<br>623 | 5123<br>6124 | | | | | | |
| n=7 | 31<br>41<br>51<br>612<br>72 | 413<br>512<br>6123<br>7123 | 5134<br>6124<br>7123 | 61<br>71 | | | | | |
| n=8 | 31<br>41<br>52<br>62<br>712<br>812 | 41<br>512<br>613<br>723<br>8123 | 5134<br>6124<br>7123<br>81234 | 6134<br>7124<br>8123 | 71<br>81 | | | | |
| n=9 | 31<br>41<br>51<br>62<br>72<br>812<br>912 | 41<br>52<br>612<br>713<br>823<br>9123 | 5134<br>6124<br>7123<br>8123<br>9123 | 61345<br>71245<br>81235<br>91234 | 7134<br>8124<br>9123 | 81<br>91 | | | |
| n=10 | 31<br>41<br>51<br>62<br>72<br>812<br>912<br>1012 | 41<br>52<br>63<br>712<br>813<br>923<br>10123 | 534<br>6123<br>7124<br>8134<br>9234<br>101234 | 61345<br>71245<br>81235<br>91234<br>1012345 | 71345<br>81245<br>912356<br>1012346 | 8134<br>9124<br>10123 | 91<br>101 | | |
| n=11 | 31<br>41<br>51<br>62<br>72<br>82<br>912<br>1012<br>1112 | 43<br>53<br>62<br>713<br>813<br>912<br>10123<br>11123 | 513<br>624<br>714<br>823<br>9134<br>10234<br>111234 | | 713456<br>812456<br>912356<br>1012346<br>1112345 | 81345<br>912457<br>1012356<br>11123467 | 9134<br>10124<br>11123 | 101<br>111 | |
| n=12 | 31<br>41<br>51<br>61<br>72<br>82<br>92<br>1012<br>1112<br>1212 | 41<br>52<br>63<br>712<br>812<br>913<br>1023<br>11123<br>12123 | | | | 813456<br>912456<br>10123567<br>11123467<br>12123457 | 91235678<br>1012346<br>1112457<br>1213458 | 10123<br>11124<br>12134 | 111<br>121 |

PARITY CHECK POSITIONS FOR ALPHABETS OF FIG.4

INVENTOR
D. SLEPIAN
BY Alan C. Rose
ATTORNEY

United States Patent Office 2,926,215

Patented Feb. 23, 1960

2,926,215

ERROR CORRECTING SYSTEM

David Slepian, Morristown, N.J., assignor to Bell Telephone Laboratories, Incorporated, New York, N.Y., a corporation of New York Application August 24, 1955, Serial No. 530,278

8 Claims. (Cl. 178—23)

This invention relates to code transmission systems, and more specifically to apparatus for and a method of correcting errors in transmitted code groups. The principal object of the present invention is the simplification of such systems.

In the field of digital computers and in pulse systems for the transmission of signal information, binary code groups or code sequences are frequently employed. These binary code sequences may take the form of trains of positive and negative electrical pulses, for example, and are represented in writing by the symbols "0" and "1." When the system is subject to errors or distortion, the code sequences may be divided into information digits and check digits to permit correction of errors at the receiver.

As disclosed in R. W. Hamming and B. D. Holbrook Patent 2,552,629, granted May 15, 1951 (Reissue 23,601), the check digits may be fixed linear combinations of the information digits. At the receiver, the same linear combinations of information digits are compared with corresponding check digits, and the resulting check sequence may be employed to determine which of the information and check digits in the received code sequence are in error. This information may in turn be employed to correct or verify the received information digits.

In accordance with the present invention, the possible erroneous code sequences are classified mathematically into "cosets" in accordance with a "coset leader" or factor by which each incorrect code sequence in the particular coset must be multiplied to produce the corresponding correct code sequence. In the simplified code corrector employing these principles, check sequences are identified with specific coset leaders, and the information digits of the received code sequences are corrected directly by multiplication by the appropriate coset leader.

In the correcting systems of the prior art, it is customary to correct single errors in code sequences. When there is a high rate of error in the transmission of coded data, however, it may be desirable to correct multiple errors.

Accordingly, a collateral object of the present invention is the optimum correction of multiple errors in code sequences.

In general, the principles of the invention as set forth above are applicable to systems employing code sequences having an arbitrary number of information and check digits. However, the present invention is particularly applicable to systems having code sequences with sufficient check digits to permit the correction of more than one error in the transmitted code group. Thus, for example, correcting systems are disclosed which correct all single errors in the received code sequences, and as many multiple errors as is theoretically possible in view of the relative number of check digits and information digits.

An important advantage of the present correction system is that it is the best possible detection system in the sense that no other possible detection scheme gives a greater probability of properly correcting received code sequences.

Other objects and various advantages and features of the invention will become apparent by reference to the following detailed description taken in conjunction with the appended claims and the accompanying drawings forming a part thereof.

In the drawings:

Fig. 4 is a table indicating the number of single and multiple errors for various designated alphabets; and Fig. 5 is a table indicating the parity check positions for preferred alphabets.

By way of introduction to the detailed description of the invention, a simple two-digit signalling code will now be considered. When only two binary information digits are employed, the four possible signalling combinations are: 00, 10, 01 and 11. Under ideal signalling conditions, the signal which is transmitted is received in its original form. For the purposes of the present invention, however, it is assumed that the transmission channel is subject to substantial noise or distortion.

Figures 1, 2:
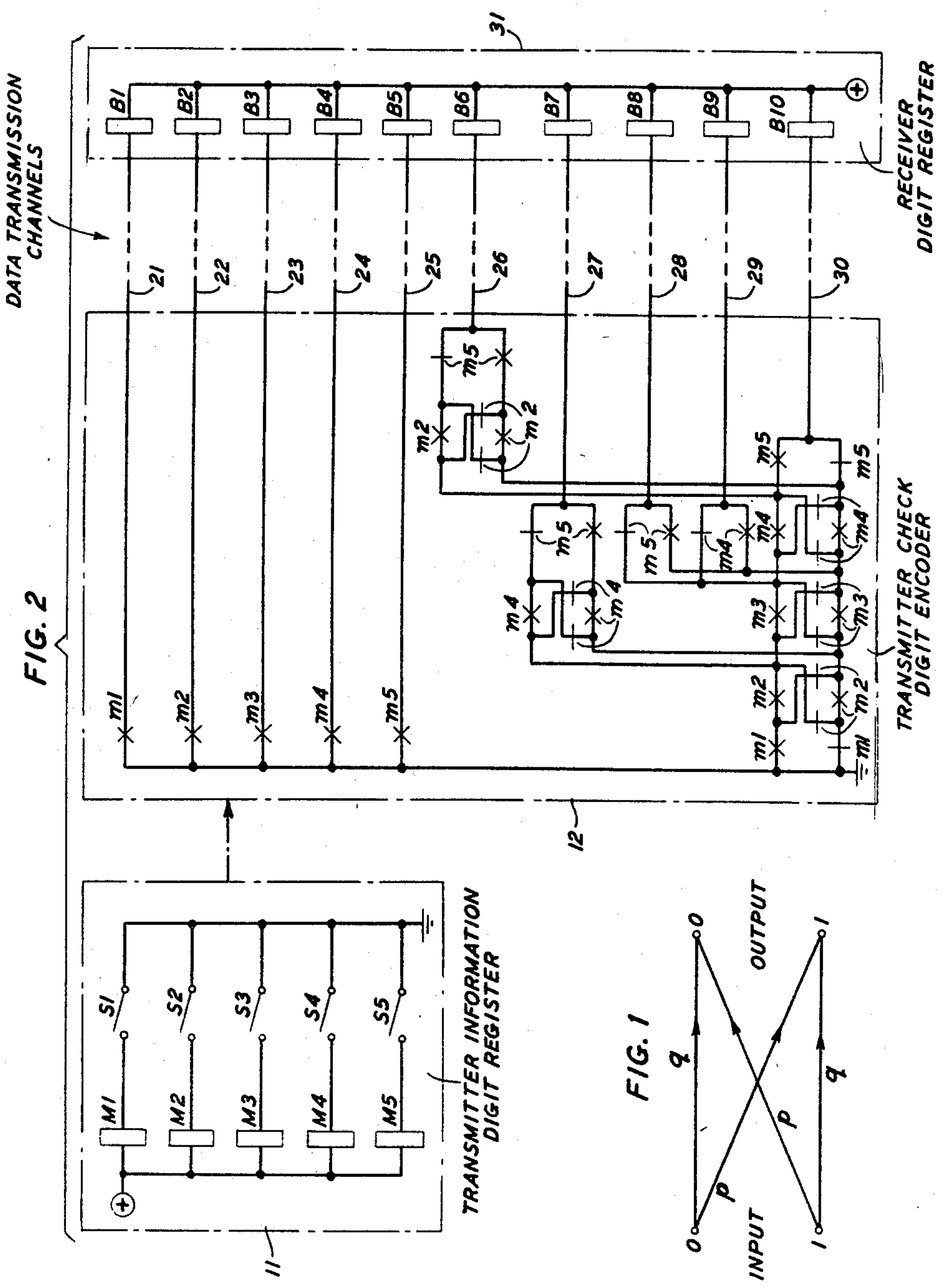
Fig. 1 is a diagram indicating the probabilities that transmitted binary signals will be received correctly.
Fig. 2 is a portion of a self-correcting signalling system showing the transmitter and the receiving registers.

Fig. 1 indicates graphically the probability that a "1" will be received as a "0" and vice versa. As shown in Fig. 1, a transmitted "0" is received as a "0" with probability $q$, and is received as a "1" with probability $p=1-q$. The channel is assumed to be symmetrical, so that a transmitted "1" is received as a "1" with probability $q$ and is received as a "0" with probability $p=1-q$. The range of $p$ of interest is that in which $p>0$, indicating that there is some probability of erroneous transmission, and in which $p<1/2$ which means that the probability of correct reception of a given symbol is greater than fifty percent.

Under adverse signalling conditions, such as those indicated in the preceding paragraph, the four code sequences 00, 10, 01 and 11 mentioned above could easily be received incorrectly. To check the accuracy of transmission, two check digits are added to the two information digits in each of the code sequences. A resulting four-digit code sequence is designated $a_1$, $a_2$, $a_3$, $a_4$, the first two digits $a_1$, $a_2$ being the information digits and the second two digits $a_3$, $a_4$ being the check digits. The check digits are determined by parity check rules, and these rules normally require that the check digits be fixed linear combinations of the information digits. In the present instance, for example, $a_3=a_1$, and $a_4=a_1\dotplus a_2$. The symbol $\dotplus$ indicates a binary sum, with any carry being discarded. The code sequences in the first row below illustrate the principles set forth in the preceding paragraph.

TABLE I

| 0000 | 1011 | 0101 | 1110 | (alphabet) |
|---|---|---|---|---|
| 0100<br>0010<br>1000<br>coset leaders | 1111<br>1001<br>0011 | 0001<br>0111<br>1101 | 1010<br>1100<br>0110 | erroneous code sequences (cosets). |

In Table I, the first two digits of each of the code sequences in the top row are the information digits, and correspond to our original two-digit signalling code sequences 00, 10, 01 and 11. The second two digits in each code sequence of the top row are the parity check digits, and are determined as indicated in the preceding paragraph.

All of the sixteen possible combinations of four binary digits are shown in Table I. The four meaningful signalling sequences in the top row are termed a group alphabet. The group alphabet shown in Table I has four "letters," or code sequences. The twelve erroneous code sequences are listed in three rows or "cosets" below the four letters of the group alphabet.

In setting up Table I, the meaningful code sequence or letter having the least number of "1's" is placed to the left. The weight of a sequence is defined as the number of "1's" in the sequence. Accordingly, the first letter of the alphabet, 0000, has the least weight.

In the example of Table I, the erroneous code sequences or cosets are developed by taking an erroneous code sequence of minimal weight, such as 0100, which does not appear in the alphabet of the first row, and "multiplying" each of the letters of the alphabet by it. The product of two $n$-place binary sequences $a_1, a_2 \ldots a_n$ and $b_1, b_2 \ldots b_n$ is defined as $a_1 \dot{+} b_1, a_2 \dot{+} b_2 \ldots a_n \dot{+} b_n$, where the symbol $\dot{+}$ indicates a binary addition operation in which the carry is ignored, as mentioned above. The resulting series of sequences is termed a "coset," and the first sequence of each coset is termed the coset leader. For example, in Table I the sequence 0100 is the coset leader of the coset 0100, 1111, 0001 and 1010. It should also be noted that each sequence in the coset differs in only one place from the letter at the top of the column in which the sequence appears. Thus, for example, sequence 0001 was formed by multiplying the letter 0101 by the coset leader 0100, and sequence 0001 therefore differs from letter 0101 only in the second place. The other two cosets were developed in a similar manner by multiplying the letters of the group alphabet by the coset leaders 0010 and 1000. Each new coset leader is chosen as a sequence of minimal weight which is not already included in the coset table.

When the transmitter sends one of the four letters in the top row of Table I, an error may be introduced in transmission, and one of the twelve erroneous code sequences may be received. When an erroneous code sequence is received, it is desirable to determine which code sequence was most likely to have been sent, and to correct the error. This is accomplished by determining the coset in which the received sequence falls, and then multiplying the received sequence by the appropriate coset leader to produce the letter heading the column in which the received sequence appears. Thus, if the sequence 0111 is received, it is multiplied by the corresponding coset leader 0010 to produce the letter 0101. Checking this operation from a physical standpoint, it may be noted that the sequence 0111 is more nearly like the code sequence 0101 than the other three letters 0000, 1011, or 1110 of the alphabet. The mechanical process therefore selects the letter which is the one which was most likely to have been sent by the transmitter.

In selecting the appropriate coset leader for a given received sequence, parity checks are performed on the sequence which are similar to those by which the check digits were developed. Specifically, it will be recalled that with the four digits of the code sequence being identified as $a_1$, $a_2$, $a_3$ and $a_4$, the check digits were developed as follows: $a_3=a_1$, and $a_4=a_1 \dot{+} a_2$. The received group is now subjected to a parity check which may be thought of as a determination of the validity of the parity check by which the check digits were formed. This is accomplished by adding the check digit to the digits which determined its value. Thus, where $b_1$, $b_2$, $b_3$ and $b_4$ are the digits of the received code, $b_3$ is added to $b_1$ to form the first digit of a parity check sequence, and $b_4$ is added to $b_1$ and $b_2$ to form the second digit of the check sequence. This is expressed mathematically as follows:

$$c_1=b_1 \dot{+} b_3$$
$$c_2=b_1 \dot{+} b_2 \dot{+} b_4 \quad (1)$$

where $c_1$ and $c_2$ are the two digits of the parity check sequence.

If the received sequence is one of the letters of the alphabet of Table I, the parity check sequence $c_1$, $c_2$ will be 00, and no change will be required. All of the possible values of the parity check sequence $c_1$, $c_2$, together with the corresponding coset leaders, are listed below:

$$\begin{aligned} 00 &\rightarrow 0000 \\ 01 &\rightarrow 0100 \\ 10 &\rightarrow 0010 \\ 11 &\rightarrow 1000 \end{aligned} \quad (2)$$

Accordingly, after determining the parity check sequence, the received sequence is corrected by multiplication by the appropriate coset leader.

In the preceding paragraphs a particular four-letter, four-place group alphabet and a method of correcting erroneous sequences were considered. Some of the properties of generalized K-letter, $n$-place alphabets will now be considered. As illustrated by the alphabet in the upper row of Table I, a K-letter, $n$-place binary signalling alphabet is a collection of K distinct sequences, or letters, of $n$ binary digits. The integer K is termed the size of the alphabet. When there are $k$ information digits in each $n$-place letter of an alphabet, the size of the alphabet K is equal to $2^k$. Thus, for example, in the alphabet shown in the top row of Table I, the first two digits were information digits ($k=2$), and the four possible combinations of the two information digits determined the size of the alphabet ($K=4$).

In developing the letters of the alphabet which appear in the top row of Table I, all possible combinations of the information digits were formed, and then the two parity check digits were added. When this procedure is followed for code sequences having any arbitrary number of information digits $k$ and total digits $n$, the resulting $n$-place binary sequences form (when multiplication is defined as mentioned above) what is known mathematically as an Abelian (or commutative) group of order $2^n$. The properties of such a group may be listed as follows, where A, B and C are elements ($n$-place sequences in the case under consideration) of the group:

(1) $A(BC)=(AB)C$, which is the associative law.

(2) The product of any two elements of the group is again one of the elements of the group.

(3) There exists an identity element I such that $$IA=A$$
$$AI=A$$

for every element A in the collection.

(4) For every element A in the collection, there is an element $A^{-1}$, such that $$AA^{-1}=I$$
$$A^{-1}A=I$$

(5) An abelian group satisfies $AB=BA$ for all A and B in the collection.

A more detailed discussion of Abelian and other groups is presented in a text entitled "The Theory and Applications of Finite Groups" by G. A. Miller, H. F. Blichfeldt and L. E. Dickson, G. S. Stechert and Co., New York, 1938.

Now that a specific simple example of the correction method has been considered, a more general analysis of group alphabets will be developed. In the following analysis, the notation $(n, k)$-alphabet will be used to designate an alphabet in which $n$ represents the total number of digits, and $k$ represents the number of information digits in each code sequence. The $2^n$ different $n$-place binary sequences form an Abelian group to be designated $B_n$. Every $(n,k)$-alphabet is a subgroup of this group.

Let the letters of a specific $(n, k)$- alphabet be $A_1=I=00 \ldots 0, A_2, A_3 \ldots A_\mu$, where I is the identity element, and $\mu=2^k$. The group $B_n$ can be developed according to this subground and its cosets as follows:

$$\begin{array}{l} B_n=I, A_2, A_3, \ldots, A_\mu \\ S_2, S_2A_2, S_2A_3, \ldots, S_2A_\mu \\ S_3, S_3A_2, S_3A_3, \ldots, S_3A_\mu \\ \cdot \\ \cdot \\ \cdot \\ S_\nu, S_\nu A_2, S_\nu A_3, \ldots, S_\nu A_\mu \end{array} \quad (3)$$

where:

$$\mu=2^k,$$
$$\nu=2^{n-k}$$

In the array (3), every element of $B_n$ appears once and only once. The collection of elements in any row of this array is a coset of the $(n, k)$-alphabet. $S_2$ is any element of $B_n$ which does not appear in the first row of the array; $S_3$ is any element of $B_n$ not in the first two rows of the array, et cetera. The elements $S_2, S_3, \ldots, S_\nu$ appearing under the identity element I in the array $B_n$ are the coset leaders.

If a coset leader is replaced by any element in the coset, the same coset will result. That is to say, the following two collection of elements are the same:

$$\begin{array}{l} S_1, S_1A_2, S_1A_3, \ldots, S_1A_\mu \\ S_1A_k, (S_1A_k)A_2, (S_1A_k)A_3, \ldots (S_1A_k)A_\mu \end{array} \quad (4)$$

As mentioned above, the weight $w_i=w(T_i)$ of an element $T_i$ of $B_n$ is defined as the number of "1's" in the $n$-place binary sequence $T_i$. Henceforth, the leader of each coset shall be taken to be an element of minimal weight in that coset. Such a table will be called a "standard array." The array of Table I, for example, is such a standard array.

The operation of a detector and corrector for an $(n, k)$-alphabet will now be considered. When any letter, for example $A_j$, of the alphabet is transmitted, the received sequence can be any element of $B_n$. If the received element of $B_n$ lies in colum $i$ of the array (3), the detector prints the letter $A_i$, $i=1, 2, \ldots, \mu$. It is now assumed that the array (3) is a standard array, and therefore that the coset leader of each row is the minimal weight element of the coset.

The measure of the quality of a correction system is the probability that the correction system will produce the code sequence which was originally transmitted. We will define the probability $l_i=l(T_i)$ of an element $T_i$ of $B_n$ to be $$l_i=p^{w_i}q^{n-w_i}$$

where $p$ and $q$ are as indicated hereinabove in connection with the description of Fig. 1, and $w_i$ is the weight of $T_i$. Let $Q_i$, $i=1,2, \ldots \mu$ be the sum of the probabilities of the elements in the $i$th column of the standard array (3). Under these circumstances, the probability that any transmitted letter of the $(n, k)$-alphabet be produced correctly by the detector is $Q_1$. A detector which operates as indicated in the preceding paragraph is a maximum likelihood detector. That is, for a given alphabet no other detection scheme has a greater average probability that a transmitted letter will be produced correctly by the detector.

In studying the properties of error correcting systems, it is often useful to introduce a geometric model. For example, we may consider the elements of the array (3) as the vertices of a cube of unit edge in a Euclidean space of $n$ dimensions. For example, the five-place sequence 0, 1, 0, 0, 1 is associated with the point in a five-dimensional space whose coordinates are (0, 1, 0, 0, 1). More generally, the choice of a K-letter, $n$-place alphabet corresponds to designating K particular vertices as letters. Since the binary sequence corresponding to any vertices can be produced by the channel output, the detector must associate various vertices of the cube with the vertices designated as letters of the alphabet. Every vertex will, in fact, be asociated with some letter. The vertices of the cube are divided into disjoint sets, $W_1, W_2, \ldots, W_K$ where $W_i$ is the set of vertices associated with the letter of the signalling alphabet designated $i$. A maximum likelihood receiver is characterized by the fact that every vertex in $W_i$ is as close to or closer to the letter $i$ than to any other letter. For group alphabets and the detector specified hereinabove, this means that no element in column $i$ of array (3) is closer to any other letter A than it is to $A_i$.

It may also be shown that the maximum likelihood sets of vertices $W_1, W_2, \ldots, W\mu$ are all geometrically similar. Loosely, this means that in an $(n, k)$-alphabet every letter is treated the same. Every two letters have the same number of nearest elements associated with them, the same number of next nearest elements, et cetera. In addition, the disposition of points in any two W regions is the same. This means that every transmitted code sequence of an $(n, k)$-alphabet has the same probability of being decoded correctly, and is considered to be a significant feature of the invention.

There are certain equivalences in groups which are useful in reducing the combinations which must be studied in determining the properties of groups. For example, two group alphabets are called equivalent if one can be obtained from the other by a permutation of places. It may readily be shown that equivalent $(n, k)$-alphabets have the same probability $Q_1$ of correct transmission for each letter. In addition, every $(n, k)$-alphabet is equivalent to an $(n, k)$-alphabet the first $k$ places of which are information places, and the last $n-k$ places of which are determined by parity checks over the first $k$ places. Accordingly, we may henceforth limit our considerations to $(n, k)$-alphabets whose first $k$ places are information places, with no loss of generality. The parity check rules can then be written as follows:

$$a_i=\sum_{j=1}^{k}\gamma_{ij}a_j,\ i=k+1, \ldots, n \quad (5)$$

where the sums are binary sums with any carry being discarded. Here, as before a typical letter of the alphabet is the sequence $a_1a_2 \ldots a_n$. The $\gamma_{ij}$ are $k(n-k)$ quantities, zero or one, that serve to define the particular $(n, k)$-alphabet in question.

For any element T, of $B_n$ the sum given at the right of Equation 5 can be formed. This sum may or may not agree with the symbol in the check place designated $i$ of the element T. If it does agree, T is said to satisfy the parity check in this place, otherwise T fails the parity check for this digit position. When a set of parity check rules (5) is given, an $(n-k)$-place binary sequence R(T) may be associated with each element T of $B_n$. This is accomplished by examining each check place of T in order, starting with the first check digit position of T. A "0" is written if a place of T satisfies the parity check; a "1" is written if a place fails the parity check. The resultant sequence of "0's" and "1's" written from left to right is R(T). We call R(T) the parity check sequence of T. The method of forming a parity check sequence was indicated by Equation 1, and representative check sequences for elements in Table I were shown at (2). When the check rules are followed systematically, all of the elements in a given row or coset of $B_n$ have the same check sequence, and this check sequence will be different from that of the elements of any other row. This was shown in detail hereinabove for a (4, 2)-alphabet at (2), and can be proved true for a general $(n, k)$-alphabet as well.

The probability $Q_1$ that a transmitted letter be produced correctly by the detector is the sum, $$Q_1=\sum_{1}^{\nu}l(S_i)$$

of the probabilities of the coset leaders. This sum can be rewritten as $$Q_1=\sum_{i=0}^{n}\alpha_i p^i q^{n-i}$$

where $\alpha_i$ is the number of coset leaders of weight $i$. It follows that $\Sigma\alpha_i=\nu=2^{n-k}$ for an $(n, k)$-alphabet. Also, $$\alpha_i\leq\binom{n}{i}=\frac{n!}{i!(n-i)!}$$

since this is the number of elements of $B_n$ of weight $i$.

The $\alpha_i$ have a special physical significance. Due to the noise on the channel, a transmitted letter, $A_i$, of an $(n, k)$-alphabet may in general be received at the channel output as some element T of $B_n$ different from $A_i$. If T differs from $A_i$ in $s$ places, i.e., if $w(A_iT)$—$s$, we say that an $s$-tuple error has occurred. For a given $(n, k)$-alphabet, $\alpha_i$ is the number of $i$-tuple errors which can be corrected by the alphabet in question, where $i$ may be any integer from zero up to the total number of digits in each sequence ($i=0, 1, 2, \ldots, n$).

Fig. 4 gives the $\alpha_i$ corresponding to the largest possible value of $Q_1$ for a given $k$ and $n$ for $k=2, 3, \ldots n-1$, $n=4 \ldots, 10$ in addition to a few other scattered values of $n$ and $k$. For reference, the binomial coefficients $$\frac{(n)}{(i)}$$

are also listed. For example, it is shown in Fig. 4 that the best group alphabet with $2^4=16$ letters that uses $n=10$ places has a probability of correct transmission $Q_1=q^{10}+10q^9p+39q^8p^2+14q^7p^3$. The alphabet corrects all ten possible single errors. It corrects thirty-nine of the possible $$\binom{10}{2}=45$$

double errors (second column of Fig. 4), and in addition corrects fourteen of the one hundred and twenty triple errors. By adding an additional place to the alphabet, one obtains with the best (11, 4)-alphabet an alphabet with sixteen letters that corrects all eleven possible single errors and all fifty-five possible double errors as well as sixty-one triple errors. Such an alphabet is applicable to a computer representing decimal numbers in binary form.

For each set of $\alpha$'s listed in Fig. 4, there is in Fig. 5 a set of parity check rules which determines an $(n, k)$-alphabet having the given $\alpha$'s. The notation used on Fig. 5 is best explained by an example. A (10, 4)-alphabet which realizes the $\alpha$'s discussed in the preceding paragraph can be obtained as follows. Places 1, 2, 3, 4 carry the information. Place 5 is determined to make the binary sum (disregarding carries) of the entries in place 3, 4 and 5 equal to zero. Place 6 is determined by a similar parity check on places 1, 2, 3 and 6; place 7 by a check on places 1, 2, 4 and 7, et cetera.

For all cases which have been investigated, an $(n, k)$-alphabet best for a given value of $p$ is uniformly best for all values of $p$, $$0\leq p\leq\frac{1}{2}$$

It is therefore considered probable that this is true for all $n$ and $k$.

The cases $k=0, 1, n-1, n$ have not been listed on Figs. 4 and 5. The cases $k=0$ and $k=n$ are completely trivial. For $k=1$, all $n>1$ the best alphabet is obtained using the parity rule $a_2=a_3=\ldots=a_n=a_1$. If $n=2j$, $$Q_1=\sum_{0}^{j-1}\binom{n}{i}p^iq^{n-i}+\frac{1}{2}\binom{n}{j}p^jq^j$$

If $$n=2j+1,\ Q_1=\sum_{0}^{j}\binom{n}{i}p^iq^{n-i}$$

For $k=n-1$, $n>1$, the maximum $Q_1$ is $Q_1=q^{n-1}$ and a parity rule for an alphabet realizing this $Q_1$ is $a_n=a_1$.

If the $\alpha$'s of an $(n, k)$-alphabet are of the form $$\alpha_i=\binom{n}{i},\ i=0, 1, 2, \ldots, j,\ \alpha_{j+1}=r$$

where $r$ is some integer, and $\alpha_{j+2}=\alpha_{j+3}=\ldots=\alpha_n=0$, then there does not exist a $2^k$-letter, $n$-place alphabet of any sort better than the given $(n, k)$-alphabet. It will be observed that many of the $\alpha$'s of Fig. 4 are of this form. It can be shown that if $$n+\binom{n-k}{2}+\binom{n-k}{3}\geq 2^{n-k}-1$$

there exists no $2^k$-letter, $n$-place alphabet better than the best $(n, k)$-alphabet. When the above inequality holds the $\alpha$'s are either $\alpha_0=1$, $\alpha_1=2^{n-k}-1$, all other $\alpha=0$; or $$\alpha_0=1,\ \alpha_1=\binom{n}{1},\ \alpha_2=2^{n-k}-1-\binom{n}{1}$$

all other $\alpha=0$; or the trivial $a_0=1$ all other $\alpha=0$ which holds when $k=n$. The region of the $n-k$ plane for which it is known that $(n, k)$-alphabets cannot be excelled by any other is shown on Table II.

TABLE II

*Region of the $n-k$ plane for which it is known that $(n, k)$-alphabets cannot be excelled*

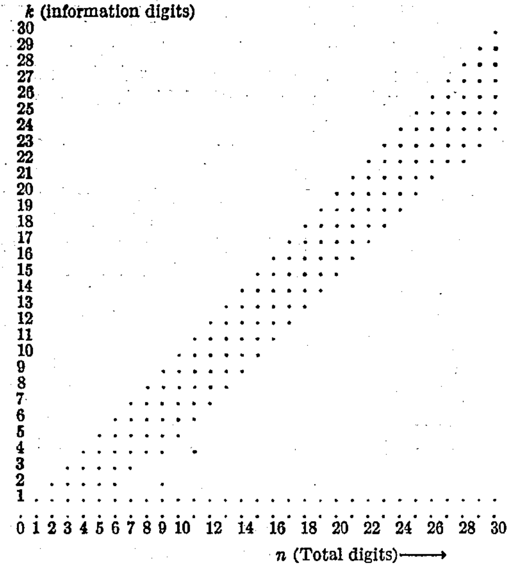

As a practical example of the use of $(n, k)$-alphabets consider the case of a channel with $p=.001$, i.e., on the average one binary digit per thousand is received incorrectly. Suppose we wish to transmit messages using thirty-two different letters. If we encode the letters into the thirty-two five-place binary sequences and transmit these sequences without further encoding, the probability that a received letter be in error is $1-(1-p)^5=.00449$. If the best (10, 5)-alphabet as shown on Figs. 4 and 5 is used, the probability that a letter be wrong is $$1-Q_1=1-q^{10}-10qp^9-21q^8p^2=24p^2 -72p^3+--=.000024$$

Thus, by reducing the signalling rate by one-half, a more than one hundredfold reduction in probability of error is accomplished.

A (10, 5)-alphabet to achieve these results is given on Fig. 5. A typical letter of the alphabet is represented by the ten-place sequence of binary digits $a_1a_2\ldots a_9a_{10}$. The symbols $a_1a_2a_3a_4a_5$ carry the information and can be any of thirty-two different arrangements of "0's" and "1's." The remaining places are determined by the following parity rules:

$$a_6 = a_1 \dotplus a_3 \dotplus a_4 \dotplus a_5$$
$$a_7 = a_1 \dotplus a_2 \dotplus a_4 \dotplus a_5$$
$$a_8 = a_1 \dotplus a_2 \dotplus a_3 \dotplus a_5$$
$$a_9 = a_1 \dotplus a_2 \dotplus a_3 \dotplus a_4$$
$$a_{10} = a_1 \dotplus a_2 \dotplus a_3 \dotplus a_4 \dotplus a_5 \qquad (6)$$

To design the detector for this alphabet, it is first necessary to determine the coset leaders for a standard array formed for this alphabet. This can be done in a straightforward manner, as discussed above. A set of appropriate coset leaders and the corresponding parity check sequences is given on Table III.

TABLE III

*Coset leaders and parity check sequences for a ten-digit alphabet with five information digits*

| $c_1c_2c_3c_4c_5 \longleftrightarrow S$ | | $c_1c_2c_3c_4c_5 \longleftrightarrow S$ | |
|---|---|---|---|
| 00000 | 0000000000 | 11100 | 0000100001 |
| 10000 | 0000010000 | 11010 | 0001000001 |
| 01000 | 0000001000 | 11001 | 0001000010 |
| 00100 | 0000000100 | 10110 | 0010000001 |
| 00010 | 0000000010 | 10101 | 0010000010 |
| 00001 | 0000000001 | 10011 | 0010000100 |
| 11000 | 0000011000 | 01110 | 0100000001 |
| 10100 | 0000010100 | 01101 | 0100000010 |
| 10010 | 0000010010 | 01011 | 0100000100 |
| 10001 | 0000010001 | 00111 | 0100001000 |
| 01100 | 0000001100 | 11110 | 1000000001 |
| 01010 | 0000001010 | 11101 | 0000100000 |
| 01001 | 0000001001 | 11011 | 0001000000 |
| 00110 | 0000000110 | 10111 | 0010000000 |
| 00101 | 0000000101 | 01111 | 0100000000 |
| 00011 | 0000000011 | 11111 | 1000000000 |

A maximum likelihood detector for the (10, 5)-alphabet in question forms from each received sequence $b_1b_2 \ldots b_{10}$ the parity check symbol $c_1c_2c_3c_4c_5$ where $$c_1 = b_6 \dotplus b_1 \dotplus b_3 \dotplus b_4 \dotplus b_5$$
$$c_2 = b_7 \dotplus b_1 \dotplus b_2 \dotplus b_4 \dotplus b_5$$
$$c_3 = b_8 \dotplus b_1 \dotplus b_2 \dotplus b_3 \dotplus b_5$$
$$c_4 = b_9 \dotplus b_1 \dotplus b_2 \dotplus b_3 \dotplus b_4$$
$$c_5 = b_{10} \dotplus b_1 \dotplus b_2 \dotplus b_3 \dotplus b_4 \dotplus b_5 \qquad (7)$$

According to Table III, if $c_1c_2c_3c_4c_5$ contains less than three "1's," the detector prints $b_1b_2b_3b_4b_5$. The detector prints $(b_1 \dotplus 1)b_2b_3b_4b_5$ if the parity check sequence $c_1c_2c_3c_4c_5$ is either 11111 or 11110; the detector prints $b_1(b_2 \dotplus 1)b_3b_4b_5$ if the parity check sequence is 01111, 00111, 01011, 01101, or 01110; the detector prints $b_1b_2(b_3 \dotplus 1)b_4b_5$ if the parity check sequence is 10111, 10011, 10101, or 10110; the detector prints $$b_1b_2b_3(b_4 \dotplus 1)b_5$$

if the parity check sequence is 11011, 11001, 11010; and finally, the detector prints $b_1b_2b_3b_4(b_5 \dotplus 1)$ if the parity check sequence is 11101 or 11100.

Figure 3:
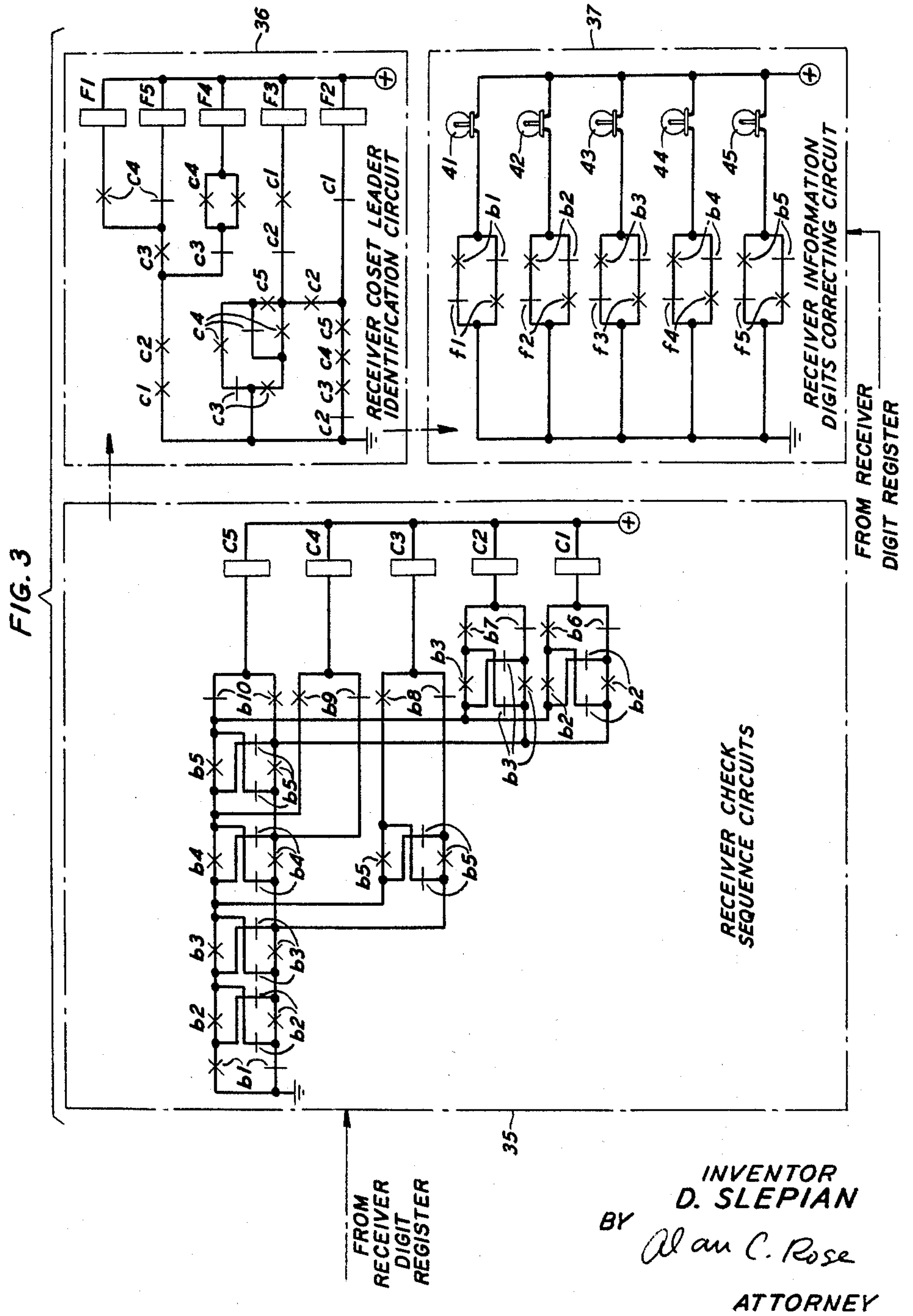
Fig. 3 shows the balance of the self-correcting signalling system, including the checking and correcting circuits.

Figs. 2 and 3 show a complete data transmission system for a (10, 5)-alphabet. The embodiment shown in Figs. 2 and 3 is a relay and switch form of the circuit. It is to be understood, however, that the same circuit can readily be instrumented electronically. In addition, the digits of each code sequence could readily be transmitted successively over a single channel, rather than in parallel over several channels as indicated in Figs. 2 and 3.

From an over-all standpoint, it may be noted that the blocks enclosed in dashed-dot lines in Figs. 2 and 3 form a block diagram of an illustrative embodiment of the invention. Thus, in Fig. 2, the transmitter includes the information digit register 11 and the transmitter check digit encoder 12. The data transmission channels are shown at 21 through 30 in Fig. 2 interconnecting the transmitter check digit encoder 12 and the receiver digit register 31. The remainder of the receiver is shown in Fig. 3. These receiver circuits include the receiver check sequence circuits 35, the coset leader identification circuit 36, and the correction circuit 37.

In Figs. 2 and 3, the flow of information between major circuital blocks is indicated by the dash-dot arrows and the supplemental legends in Fig. 3 indicating connections between Figs. 2 and 3. Thus, for example, the information registered in the relays in block 11 of Fig. 2 controls circuits in block 12. In a similar manner in Fig. 3, the arrows and legends indicate the connections from the receiver digit register 31 to the check sequence circuits 35 and the connection circuit 37. The dashed line arrow between circuits 35 and 36 indicates the derivation of the coset leader digital signals from the check signals. Similarly, the arrow between blocks 36 and 37 represents the correction action provided by the coset leader signals in their interaction with the received information digit signals.

For ease in interpreting the schematic diagrams of Figs. 2 and 3, the relay contacts and the relay structure which makes or breaks the contacts are not associated with each other. However, in nearly every instance, the contacts of a given relay are shown in the next subsequent block of the system following that in which the relay structure appears. The method of relay representation used herein follows in part the drawing analysis described by Claude E. Shannon in "A Symbolic Analysis of Relay and Switching Circuits" published in the Translations of the American Institute of Electrical Engineers, volume 57, page 713. The schematic symbols employed in accordance with the method of analysis used herein are briefly explained as follows: each rectangle represents a relay winding and structure, excepting the contacts actuated by that structure. A set of make contacts is shown by two short crossed lines through the joining point of which passes a solid line representing the connecting leads to the set of make contacts. A set of break contacts is shown by a short line, through the midpoint of which passes a solid line representing the connecting leads to the set of break contacts. The capital letter or numeral or combinations thereof within each rectangle identifies a particular relay, and the lower case letter or numeral or combinations thereof adjacent a set of contacts identifies a set of contacts operated by the relay bearing the capital letter and/or numeral designation. Thus, a set of contacts drawn

is a make set on relay M2, and one drawn

is a break set on the same relay. Other circuit elements are shown in the usual form.

The information digits of a particular code sequence which is to be transmitted are set up by closing individual switches S1 through S5 in the transmitter information digit register 11. The closure of the switches S1 through S5 actuates the relays M1 through M5 corresponding to the switches which are closed.

The principal function of the circuit included in the block designated 12 in Fig. 2 is the encoding of the check digits. This function is accomplished by the circuit located in the lower portion of block 12. The channels interconnecting the transmitter and the receiver are designated 21 through 30. Pulses are applied to channels 21 through 25 by the closure of contacts $m_1$ through $m_5$ when individual switches S1 through S5, respectively, are closed. Output pulses are applied to individual ones of the channels 26 through 30 if the appropriate parity check rules set forth above at (6) are satisfied. Thus, for example, we have seen in the last equation listed under (6) that the digit $a_{10}$ is a "1" when an odd number of "1's" are present in the information digit spaces $a_1$ through $a_5$. Similarly, it may be observed that channel 30 is only energized when an odd number of the contacts $m_1$ through $m_5$ are closed.

The digit register 31 at the receiver includes the ten relays B1 through B10 corresponding to the ten digits in each code sequence which is transmitted. The circuit shown in block 35 of Fig. 3 corresponds to the formation of the check digit sequence indicated mathematically in the Equations 7. Thus, for example, we have seen in the last equation at 7 that the last digit $c_5$ of the check sequence is a "1" only if there is an error in transmission. That is, if the parity check digit $a_{10}$ was correctly transmitted as a "1" when an odd number of the information digits $a_1$ through $a_5$ were also "1's," the last digit $c_5$ of the check sequence should be a "0." The relay C5 in block 35 of Fig. 3 should then remain deenergized. An examination of the contacts $b_1$ through $b_5$ and $b_{10}$ in the energization circuit of relay C5 clearly shows that relay C5 will be deenergized when an odd number of the five relays B1 through B5 are energized concurrently with the energization of relay B10.

The circuit 36 of Fig. 3 associates particular receiver check sequences with the appropriate correction sequences corresponding to the coset leader of the coset into which the received code sequence falls. The energization of relays F1 through F5 represent the correction sequence which is, in fact, the first five digits of the appropriate coset leader. The control circuits for the relays F1 through F5 implement Table III. Thus, for any given check sequence $c_1c_2c_3c_4c_5$ of Table III, relays F1 through F5 are energized in accordance with the first five digits of the coset leaders S of Table III. The circuit in block 37 multiplies the correction sequence and the first five information digits which have been received. The resultant corrected code sequence appears as the illumination of light bulbs 41 through 45.

It is to be understood that the above-described arrangements are illustrative of the application of the principles of the invention. Numerous other arrangements may be devised by those skilled in the art without departing from the spirit and scope of the invention.

What is claimed is:

1. In a self-correcting information system subject to severe distortion, means for transmitting binary code sequences each having $n$ digits including $k$ information digits, where $2^{(n-k)}$ is greater than $n+1$, receiving means for registering information and check digits, means for identifying a correction sequence corresponding to any of $2^{(n-k)}$ different combinations of errors, and means for correcting the received information digit sequence in accordance with said correction sequence.

2. In an information system subject to distortion, means for transmitting binary code sequences each having $n$ digits including $k$ information digits, where $2^{(n-k)}$ is greater than $n+1$, receiving means for registering information and check digits, means for forming a parity check sequence from said received digits, means for identifying a correction sequence associated with the class of errors indicated by said parity check sequence, and means for multiplying the received information digit sequence by said correction sequence.

3. In combination, means for registering five information digits forming part of a code group to be transmitted, means for forming five different linear combinations of digits selected from said five information digits, means for registering five check digits corresponding to said linear combinations to constitute the remainder of said code group, means for transmitting said code group, means for registering a received code sequence, means for checking the validity of the linear combinations by which the five check digits were formed and forming a corresponding five-digit check sequence, means for identifying a coset leader associated with the class of errors indicated by said check sequence, and means for multiplying the information digits of said received code sequence directly by the corresponding digits of said coset leader.

4. In combination, means for registering $k$ information digits forming part of an $n$ digit code group to be transmitted, means for forming $n-k$ different linear combinations of digits selected from said $k$ information digits, means for registering $n-k$ check digits corresponding to said linear combinations to constitute the remainder of said code group, where $2^{(n-k)}$ is greater than $n+1$, means for transmitting said code group, means for registering a received code sequence, means for checking the validity of the linear combinations by which the $n-k$ check digits were formed and forming a corresponding $n-k$ digit check sequence, means for identifying a coset leader associated with the class of errors indicated by said check sequence, and means for multiplying the information digits of said received code sequence directly by the corresponding digits of said coset leader.

5. In an error correction circuit for correcting all of the single errors and at least some multiple errors in code groups each including a total of $n$ digits, means for registering $k$ information digits forming part of said $n$ digit code groups, where $2^{(n-k)}$ is greater than $n+1$, means for forming $n-k$ different linear combinations of digits selected from said $n$ digits, the number of digits included in said linear combinations being less than $n-1$ digits in each case, means for registering $n-k$ check digits corresponding to said linear combinations to constitute the remainder of said code group, means for transmitting said code group, means for registering a received code sequence, means for checking the validity of the linear combinations by which the $n-k$ check digits were formed and for forming a corresponding $n-k$ digit check sequence, means for identifying the correction sequence portion of a coset leader associated with each of $2^{(n-k)}$ different classes of errors, and means for multiplying the information digits of said received code sequence directly by the corresponding digits of said correction sequence.

6. In an error correction circuit for correcting all of the single errors and at least some multiple errors in code groups each including a total of $n$ digits, means for registering $k$ information digits forming part of said $n$ digit code groups, where $2^{(n-k)}$ is greater than $n+1$, means for forming $n-k$ different linear combinations of digits selected from said $n$ digits, the number of digits included in said linear combinations being less than $n-1$ digits in each case, means for registering $n-k$ check digits corresponding to said linear combinations to constitute the remainder of said code group, means for transmitting said code group, means for registering a received code sequence, means for checking the validity of the linear combinations by which the $n-k$ check digits were formed and for forming a corresponding $n-k$ digit check sequence indicating each of $2^{(n-k)}$ different classes of errors, and means for changing the information digits of said received code sequence to a code group which is probably correct.

7. In an error correction circuit for correcting all of the single errors and at least some multiple errors in code groups each including a total of $n$ digits, means for providing $k$ information digits forming part of said $n$ digit code groups, where $2^{(n-k)}$ is greater than $n+1$, means for forming $n-k$ different linear combinations of digits selected from said $n$ digits, the number of digits included in each of said linear combinations being less than $n-1$ digits, means for forming $n-k$ check digits corresponding to said linear combinations to constitute the remainder of said code group, means for transmitting said code group, means for receiving a code sequence derived from said transmitted code group, means for checking the validity of the linear combinations by which the $n-k$ check digits were formed and for forming a corresponding $n-k$ digit check sequence, means for identifying the correction sequence portion of a coset leader associated with any of $2^{(n-k)}$ different combinations of erroneous digits, and means for correcting the information digits of said received code sequence in accordance with the errors identified by said correction sequence.

8. In an error correction circuit for correcting all of the single errors and at least some multiple errors in code groups each including a total of $n$ digits, means for providing $k$ information digits forming part of said $n$ digit code groups, where $2^{(n-k)}$ is greater than $n+1$, means for forming $n-k$ different linear combinations of digits selected from said $n$ digits, the number of digits included in each of said linear combinations being less than $n-1$ digits in each case, means for forming $n-k$ check digits corresponding to said linear combinations to constitute the remainder of said code group, means for transmitting said code group, means for receiving a code sequence derived from said transmitted code group, means for checking the validity of the linear combinations by which the $n-k$ check digits were formed and for forming a corresponding $n-k$ digit check sequence indicating each of $2^{(n-k)}$ different classes of errors, and means for changing the information digits of said received code sequence to a code group which is probably correct.

References Cited in the file of this patent

UNITED STATES PATENTS

| | | |
|---|---|---|
| Re. 23,601 | Hamming | Dec. 23, 1952 |
| 2,653,996 | Wright | Sept. 29, 1953 |